United States Patent [19]

Whitcomb

[11] 4,280,539
[45] Jul. 28, 1981

[54] TREE PROCESSING APPARATUS

[75] Inventor: Paul H. Whitcomb, Woodstock, Canada

[73] Assignee: Eaton Corporation, Cleveland, Ohio

[21] Appl. No.: 112,769

[22] Filed: Jan. 17, 1980

[51] Int. Cl.³ .................................................. B27L 1/00
[52] U.S. Cl. .............................. 144/2 Z; 144/309 AC
[58] Field of Search ................ 144/2 Z, 3 D, 309 AC

[56] References Cited

U.S. PATENT DOCUMENTS

| 3,894,568 | 7/1975 | Windsor | 144/2 Z |
| 3,960,190 | 6/1976 | Smith | 144/2 Z |
| 4,130,151 | 12/1978 | Ericsson | 144/2 Z |

Primary Examiner—W. D. Bray
Attorney, Agent, or Firm—R. J. McCloskey; R. M. Sajovec, Jr.

[57] ABSTRACT

A boom structure (12) for a tree processing apparatus (10) comprising a first upper channel member (18) oriented with its legs extending downward, a second lower channel member (20) oriented with its legs extending upward, and third and fourth channel members (22, 24) which are received between the legs of the upper and lower channel members with their legs facing inward. The four channel members are welded together to form a unitary structure of cruciform section. The side channel members define outer track means (23) which receive rollers (21) supporting a processing head (14), and inner track means (61) which receive support rollers (58) operatively attached to an actuating cylinder (38) for the processing head.

4 Claims, 8 Drawing Figures

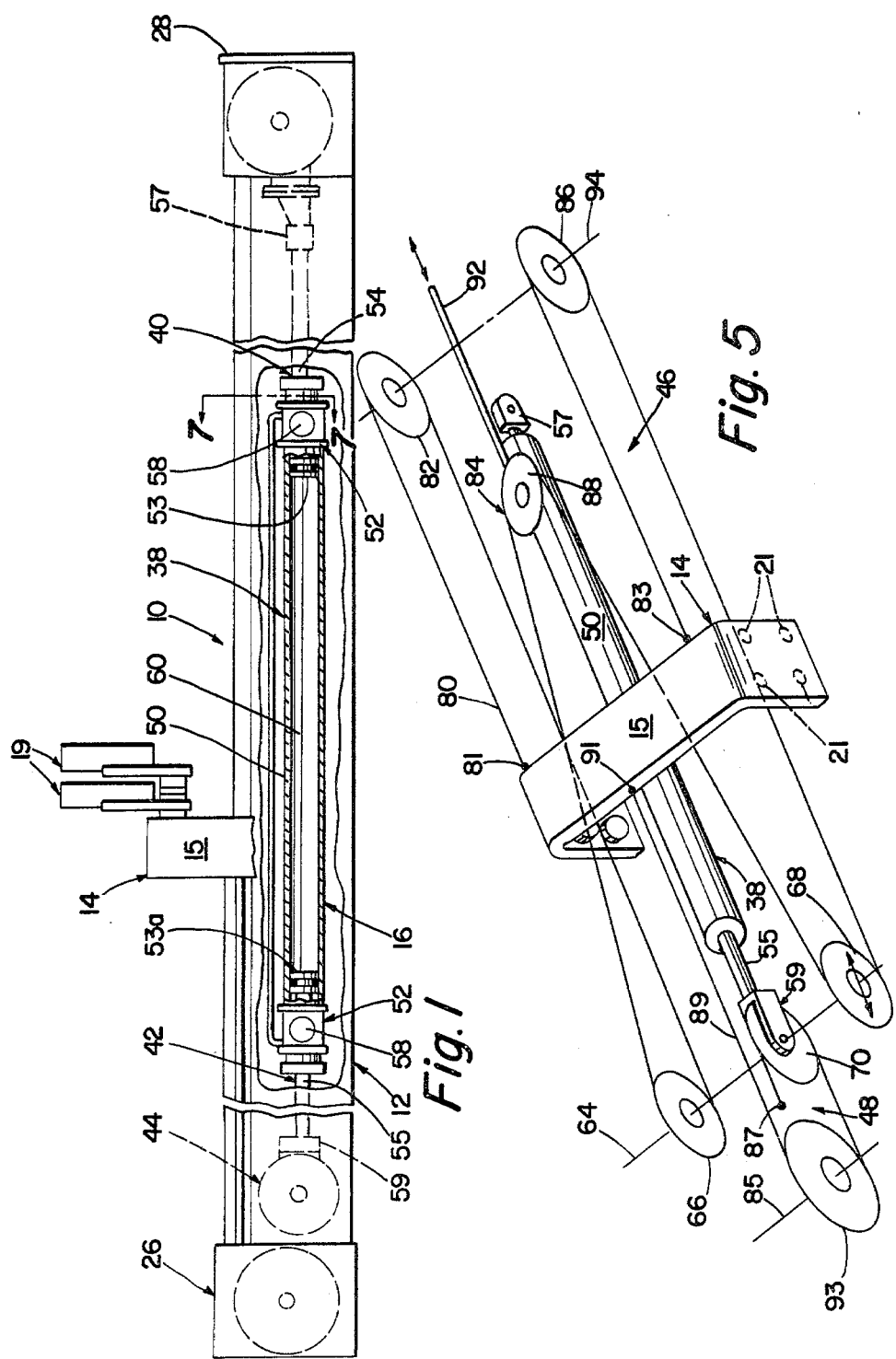

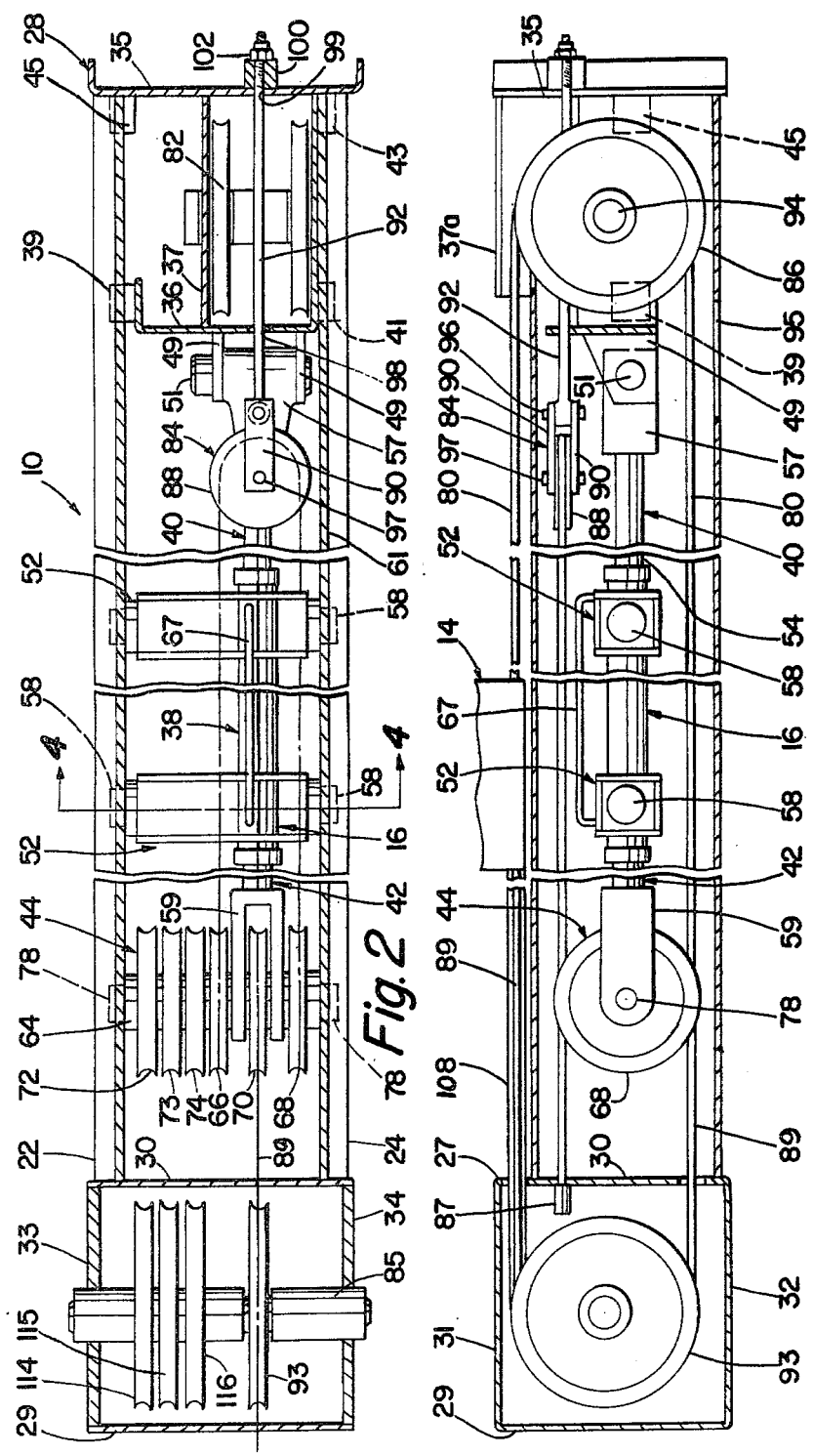

TREE PROCESSING APPARATUS

The present invention relates to apparatus for processing trees, and more particularly to an improved processing boom assembly for a tree harvester.

U.S. Pat. No. 3,894,568 discloses a tree harvester in which a felled tree is delimbed and topped by means of a processing head which travels along a horizontally oriented processing boom.

Such harvesters have proved to be very successful in processing trees of about twelve inches (30.5 cm) in diameter and thirty feet (9 m) in lengths.

An object of the present invention is to provide an improved tree harvester of the same general configuration as the above, which is capable of efficiently processing trees of at least eighteen inches (46 cm) in diameter and forty five feet (13.7 m) in length.

To meet the above objective, there is provided a tree processing apparatus comprising a fixed, elongated hollow boom structure having a hydraulic cylinder mounted inside. One end of the cylinder is fixed to the boom, and the other end drives a sheave assembly which acts on a cable system operatively attached to a processing head to drive the processing head along the boom. As the cylinder assembly extends, the cylinder body travels along the inside of the boom structure on rollers which ride within channel members formed as part of the boom structure.

The processing head is supported on rollers which ride on the outside of the above channel members, and a traveling hose system, also operatively connected to the hydraulic cylinder, provides hydraulic oil to the processing head to pressurize cylinders for actuating delimbing blades and the like.

Also provided is a single point system anchored to the boom for adjusting the tension of the processing head extend and retract cables.

Other objects and advantages of the invention will become apparent from the following description when taken in connection with the accompanying drawings, wherein:

FIG. 1 is a side elevation view of the processing boom with parts cut away to show internal details;

FIG. 2 is a plan view of the processing boom with the top of the boom structure removed and parts shown in section to show internal details;

FIG. 3 is a partial side elevation view of the processing boom with one side of the boom structure removed and parts shown in section to show internal details;

FIG. 5 is a perspective view schematically illustrating the extend and retract cables of the invention;

Figure 4:
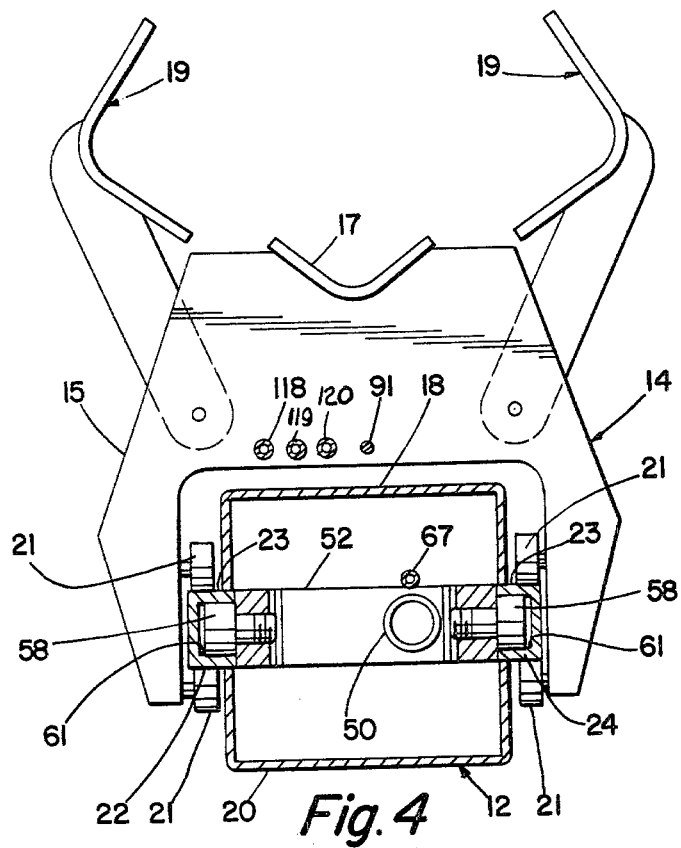
FIG. 4 is a sectional view taken along line 4—4 of FIG. 2.

Referring to the drawings, there is illustrated a tree processing apparatus, designated generally by the numeral 10, comprising a boom assembly 12, a processing head 14 mounted for movement along the boom, and a processing head drive assembly 16. The processing apparatus 10 is adapted to be mounted on a vehicle, such as that shown in U.S. Pat. No. 3,894,568, in a known manner.

BOOM ASSEMBLY

The boom assembly 12 is fabricated from a first, upper channel member 18, a second, lower channel member 20, a first side channel member 22, a second side channel member 24, a first end assembly 26 welded or otherwise fastened to the boom 12, and a second end assembly 28, which is removably attached to the boom 12.

Referring particularly to FIG. 4, the upper and lower channel members 18, 20 are oriented with their legs toward one another, with the side channel members 22, 24 received between them, the side channel members also being oriented with their legs toward one another. The ends of the upper and lower channel legs are welded to sides of the side channel legs to define a generally cruciform structure in cross section. The side channel members 22, 24 are formed of a relatively heavier gauge material than the upper and lower channel members, and define raceways for rollers on which the processing head 14 and the processing head drive assembly 16 are supported, as will be described in more detail.

Referring to FIGS. 2 and 3, the first end assembly 26 comprises an essentially closed box formed of first and second end walls 29 and 30, upper and lower walls 31 and 32 and side walls 33 and 34. The wall sections are welded together and the assembly is attached to a first end of the boom assembly 12 by welding the second end wall 30 to the ends of the channels 18-24. As shown in FIG. 3, the end assembly 26 is somewhat taller in elevation than the boom assembly 12, and an opening 27 is formed in the wall 30 above the top of the channel 18 to allow the processing head retract cable, and the hydraulic hoses to extend outside the boom structure to connect to the processing head 14, as will be described in more detail.

The second end assembly 28 comprises an end plate 35 received against a second end of the boom assembly 12, a frame member 36 which is substantially J-shaped as viewed in plan and is welded to the inside of the end plate, an intermediate wall member 37 received between the base of the J-frame member 36 and the inner wall, first and second mounting blocks 39 and 41 attached to the short and long legs respectively of the J-frame 36, a third mounting block 43 attached to the long leg of the J-frame and to the end plate 35, and a fourth mounting block 45 attached to the end plate 35. The wall member 37 extends upward through an opening formed in the upper channel and is formed into an L-shape, with the base 37a of the L extending over a portion of the boom assembly 12 to define a shield over exposed cable sheaves which will be described later. The four mounting blocks 39, 41, 43, 45 are sized to define a sliding fit inside the side channels 22, 24 and serve to position the end assembly 28 relative to the boom assembly 12. The end assembly 28 is maintained in position by forces applied to it by the drive assembly 16 as will be described later; however, the assembly can also be fixed in position by bolts or the like acting between the assembly and the boom structure. The entire second end assembly 28 is thus adopted for easy removal from the boom assembly 12 for servicing of the drive and cable assemblies.

PROCESSING HEAD

The processing head 14 comprises a frame 15, a stationary delimbing blade 17, and a pair of movable delimbing blade assemblies 19. The frame 15 is in the form of an inverted "U" with its legs straddling the boom assembly 12. A plurality of rollers 21 are mounted on the insides of the legs of frame 15 and ride on the outer surfaces 23 of the side channel members 22 and 24. Although not illustrated in FIG. 4, a second set of four rollers 21 is spaced along the length of the frame 15, as shown schematically in FIG. 5. The details of the delimbing mechanism are not part of this invention, and it can be appreciated that various mechanisms, such as that shown in U.S. Pat. No. 4,894,568, can be used. Also, a topping shear assembly (not shown) can be included so that the processing head can top each tree as well as delimbing it.

PROCESSING HEAD DRIVE ASSEMBLY

The processing head drive assembly 16 comprises a drive cylinder 38 (FIG. 1) mounted for linear movement with the boom assembly 12, including a first drive piston assembly 40 extending from one end of the cylinder and anchored to the end assembly 28, and a second drive piston assembly 42 extending from the opposite end of the cylinder and attached to a drive cable and hose sheave assembly 44; a processing head extend cable system designated generally by the numberal 46 (see FIG. 5), and a processing head retract cable system designated generally by the numberal 48.

The drive cylinder 38 comprises an elongated hydraulic cylinder body 50, the first and second piston assemblies 40 and 42, and cylinder support assemblies 52 spaced apart along the cylinder body and welded thereto.

The first piston assembly 40 comprises a piston head 53 and a piston rod 54 attached thereto and extending from the cylinder, and the second piston assembly 42 comprises a piston head 53a and a piston rod 55 with the assemblies received in back-to-back relationship within the cylinder body, as shown in FIG. 1. A first rod end 57 is welded or otherwise fastened to the free end of the rod 54 of first piston assembly 40, and a clevis 59 is welded or otherwise fastened to the free end of the rod 55 of second piston assembly 42. The rod end 57 is attached to a pair of spaced mounting plate members 49 (FIG. 2), which are welded to the J-member 36, by means of a pin 51 received through the plates 49 and the rod end 57. The yoke of the clevis 59 is attached to the cable and hose sheave assembly 44.

Each of the cylinder support assemblies 52 comprises a boxlike structure welded or otherwise attached to the cylinder body 50 and disposed substantially perpendicular to the longitudinal axis of the cylinder. Rollers 58 are mounted at opposite ends of the support assembly and are adapted to ride on the inner surfaces 61 of the legs of side channel members 22 and 24. The drive cylinder assembly 38 is supported within the side channels 22, 24 by the four rollers 58 for linear movement within the processing boom assembly 12.

Figures 7, 8:
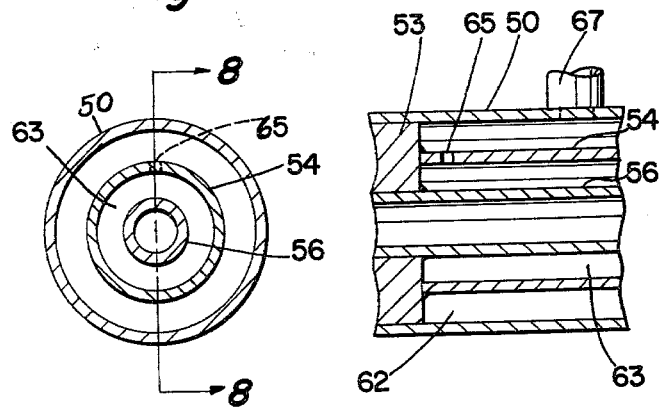
FIG. 7 is a sectional view taken along line 7—7 of FIG. 1.
FIG. 8 is a fragmentary section view taken along line 8—8 of FIG. 7.

Referring to FIG. 7, the first piston rod 54 is in the form of hollow tube, and an inner tube 56 is centrally received within it. The inner tube 56 extends through the piston 53 and opens into the space 60 between the pistons 53, 53a (see FIG. 1). When the cylinder 38 is to be extended, pressurized hydraulic oil enters the inner tube 56 through a suitable fitting (not shown) adjacent the rod end 57, and flows into the space 60 to cause the piston assemblies to separate. When the cylinder is to be retracted, hydraulic oil enters the space 63 between the inside diameter of piston rod 54 and the outside diameter of tube 56 through a second fitting (not shown) adjacent the rod end 57. A port 65 is formed through the wall of the rod 54 adjacent the piston 53 to allow pressurized oil to enter the space 62 (see FIG. 8) between the piston 53 and the rod end of cylinder body 50. An external tube 67 connects the rod ends of the cylinder body, so that when pressurized hydraulic oil enters space 63, it flows to the rod ends of both pistons to cause the pistons to come together. It can be appreciated that any form of known hydraulic system capable of alternately pressurizing the tube 56 and the conduit defined by the space 63 can be used, and such system will not be described herein in detail.

DRIVE CABLE AND HOSE SHEAVE ASSEMBLY

The sheave assembly 44 comprises a shaft 64; a first extend cable sheave 66 rotatably received on the shaft; a second extend cable sheave 68 rotatably received on the shaft; a retract cable sheave 70 rotatably mounted on the shaft; and first, second and third hose sheaves 72, 73 and 74 respectively, rotatably mounted on the shaft. The clevis 59 straddles the retract cable sheave 70 (FIG. 2), with the yoke eyes rotatably received on the shaft 64.

Rollers 78 are mounted on the ends of shaft 64 inside the side channels 22 and 24 such that the sheave assembly 44 is free to move along the inside of the boom assembly 12 on the surfaces 61 as the piston assembly 42 moves in response to pressurization of the cylinder 38.

The extend and retract cable systems 46 and 48 are illustrated schematically in FIG. 5. The extend cable system 46 comprises a cable 80, which has one end attached to the processing head 14 at 81, extends toward the second end assembly 28 (to the right in FIG. 5) where it is received around a first extend cable idler sheave 82 mounted for rotation on an axle 94 received in the frame member 36 and the wall member 37, loops back toward the first end assembly 26 (to the left in FIG. 5) where it is received around the first extend cable sheave 66, then extends back again toward the second end assembly 28 where it is received around a horizontally oriented adjustable idler sheave assembly 84 attached to the end plate 35 (as will be described in further detail below), loops back toward the first end assembly 26 where it is received around the second extend cable sheave 68, loops back toward the second end assembly 28 where it is received around a second extend cable idler sheave 86 on the axle 94, and finally loops back toward the processing head 14 where the opposite end is attached at 83.

The retract cable system 48 comprises a cable 89, which has one end attached to the processing head 14 opposite the extend cable at 91, extends toward the first end assembly 26 (to the left in FIG. 5) where it is received over a retract cable idler sheave 93 mounted for rotation on an axle 85 received through side walls 33, 34 of the end assembly 26, loops back toward the processing head 14, loops over the retract cable sheave 70, and then extends back toward the first end assembly 26 where it is fixed to the end wall 30 at 87.

Referring to FIGS. 2 and 3, the adjustable idler sheave assembly 84 comprises a horizontally oriented sheave 88 over which the extend cable 80 passes, a pair of yoke plates 90 straddling the sheave 88, and a cable tensioning rod 92 received between the plates 90 and attached thereto at one end and attached at the other end to the end plate 35.

The end of the rod 92 received between the plates 90 is flattened as shown in FIG. 3 and is attached thereto by means of a bolt or pin 96. The sheave 88 is rotatably received between the plates 90 on a pin 97 received through the plates.

The rod 92 extends through a clearance hole 98 formed in the base of the J-frame 36, and through a clearance hole 99 formed through the end plate 35. The end of the rod 92 extending through the end plate is threaded, and a spacer 100 and nut 102 are received over the rod 92 on the outer side of the end plate.

Referring particularly to FIG. 5, it can be seen that with the drive cylinder 38 in any position, the tension in both the extend cable 80 and the retract cable 89 can be adjusted by the extent to which the nut 102 is threaded onto the rod 92.

Whenever service is required on components mounted within the boom 12, the entire cylinder assembly 38 along with the sheave assembly 44 can be removed by disconnecting the hoses and the extend and retract cables from the processing head 14, and sliding the end assembly 28 out along the channels 22, 24 carrying with it the cylinder and sheave assemblies. If desired, the end assembly only can be removed by removing nut 102 from rod 92, removing pin 51 from the rod end 57 through an access hole such as 95 provided in the channel 20, and then sliding the end assembly out of the boom.

Figure 6:
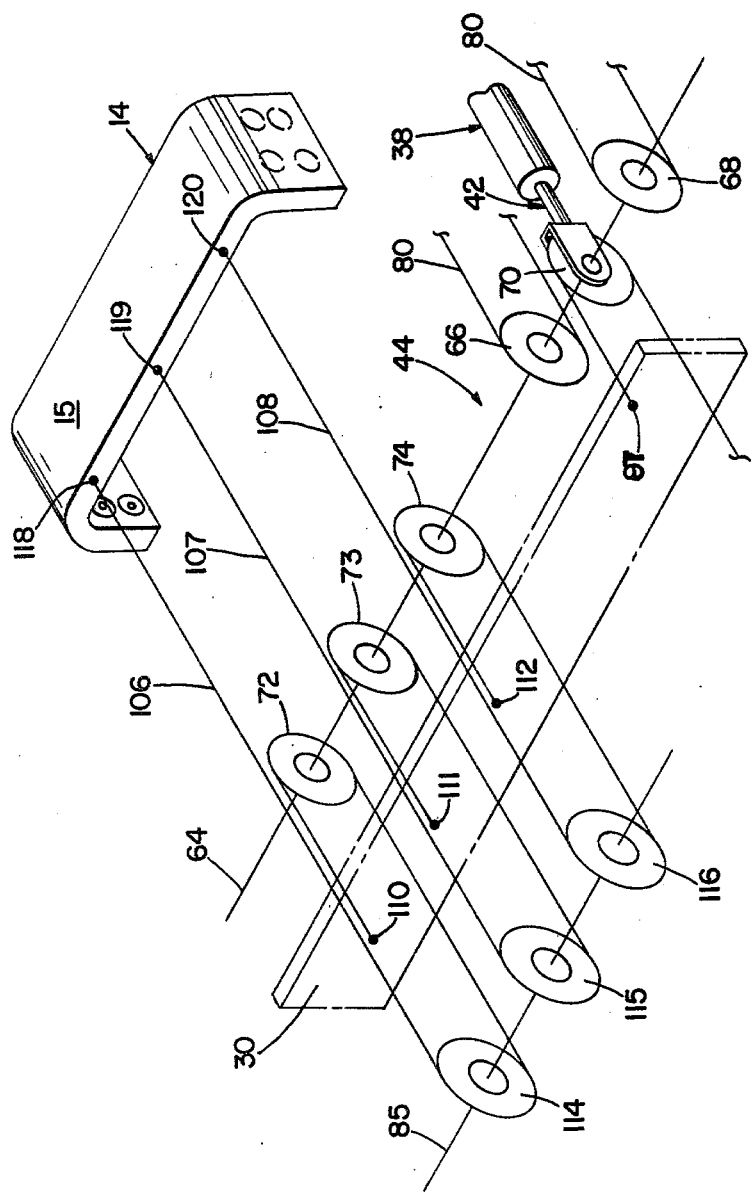
FIG. 6 is a perspective view schematically illustrating the travelling hose system of the invention.

FIG. 6 illustrates the means by which the hoses which supply hydraulic oil to the processing head are handled. In the illustrative embodiment there are three hoses 106, 107 and 108 which conduct hydraulic oil between a source (not shown) and various actuators, such as that required for the movable delimbing blade assemblies 19. It can be appeciated that more or fewer hoses may be required depending on the type and complexity of the processing head used.

The hose 106 is anchored at 110 to the wall 30 of end assembly 26, extends toward the second end assembly 28 (to the right in the drawings), loops over first hose sheave 72 which rotates on shaft 64 of the drive cable and hose sheave assembly 44, returns back toward the first end assembly 26, is received under a first hose idler sheave 114 rotatably mounted on the axle 85, and then loops over the idler sheave and returns back toward the second end assembly and is anchored at 118 to the frame 15 of the processing head 14. Hose 107 is similarly anchored to wall 30 at 111, loops over sheave 73 and a second idler sheave 115 also rotatably mounted on axle 85, and is anchored to frame 15 at 119; and hose 108 is similarly anchored to wall 30 at 112, loops over sheave 74 and a third idler sheave 116 also rotatably mounted on axle 85, and is anchored to frame 15 at 120. Since the hose sheaves 72, 73, 74 are mounted on the movable sheave assembly 44, along with the extend cable sheaves 66, 68 and the retract cable sheave 70, constant tension is maintained in the hoses as the processing head moves back and forth along the boom assembly 12.

OPERATION

When the area 60 between the pistons 40 and 42 of cylinder 38 is pressurized, the piston assemblies 40 and 42 extend outward relative to the cylinder body 50 causing the cylinder body to move to the left, as viewed in the drawings, along with the second piston assembly 42. This causes the drive cable and hose sheave assembly 44 to move to the left. As the first and second extend cable sheaves 66 and 68 move to the left, the processing boom 14 moves to the right along the channel members 22, 24.

As the processing head 14 moves to the right, it pulls the retract cable 81 along with it; however, as the cable section between the processor head 14 and the idler sheave 85 is pulled to the right, the retract cable sheave 70 is moving to the left along with the extend cable sheaves 66 and 68, thus a constant cable tension is maintained.

When the rod ends of cylinder 38 are pressurized, the cylinder body 50 and piston 42 will move to the right, thus drawing the retract cable 89 around idler sheave 85 to pull the processing head 14 to the left. As the processing head is moved to the left by the retraction of the drive cylinder, the common mounting of the extend cable sheaves 66 and 68 and the retract cable sheave 70 on the movable sheave assembly 44, insures that constant tension will be maintained in both cables. As discussed above, constant hose tension will also be maintained for any position of the processing head.

In operation, a processing cycle begins with the drive cylinder 38 fully retracted and the processing head 14 disposed to the extreme left end of the boom 12 as viewed in FIG. 1. A felled tree (not shown) is then moved into a horizontal position on the boom assembly 12 and left there with the trunk resting on the stationary delimbing blade 17. The cylinder 38 is then extended, as described above, while at the same time the movable delimbing blades 19 are closed onto the tree trunk. As the processing head 14 moves to the right, the blades 17 and 19 remove the limbs. Once the tree is processed, it is removed from the boom, and the cylinder 38 is again retracted to move the processing head 14 to the left side of the boom 12 in preparation for receiving another tree. Since the processing head and the cylinder and sheave assemblies move in opposite directions, there is minimal shifting of the center of gravity of the boom assembly, and therefore of the machine to which it is attached, thus greatly improving the stability of the machine.

I claim:

1. In apparatus for harvesting trees comprising an elongated hollow boom assembly, a processing head movable along said boom assembly and operable to delimb trees positioned adjacent said boom and substantially parallel thereto, and actuator means including linearly movable means within said boom assembly operable to move said processing head along said boom assembly, the improvement wherein said boom assembly comprises a first upper channel member oriented with its legs extending downward, a second lower channel member oriented with its legs extending upward, and third and fourth channel members received between said first and second channel members with their legs extending inwardly toward one another and attached to the legs of said first and second channel members to define a substantially cruciform section.

2. Apparatus as claimed in claim 1, including first track means defined by the outer surfaces of the legs of said third and fourth channel members, said processing head including rollers engageable with said first track means.

3. Apparatus as claimed in claim 2 including second track means defined by the inner surfaces of the legs of said third and fourth channel members, said linearly movable means including rollers engageable with said second track means.

4. Apparatus as claimed in claim 1 including closure means substantially closing an end of said boom assembly, said closure means comprising an end plate abutting said boom assembly, and one or more guide members operatively attached to said end plate and in engagement with said second track means.

* * * * *